(12) United States Patent
Hernandez Leyva et al.

(10) Patent No.: US 12,479,410 B2
(45) Date of Patent: Nov. 25, 2025

(54) AIR DRYER APPARATUS FOR A VEHICLE AIR BRAKE CHARGING SYSTEM

(71) Applicant: Bendix Commercial Vehicle Systems LLC, Avon, OH (US)

(72) Inventors: Nadia Caroline Hernandez Leyva, Chihuahua (MX); Jose Guadalupe Ayala Sanchez, Apodaca (MX)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 812 days.

(21) Appl. No.: 17/858,434

(22) Filed: Jul. 6, 2022

(65) Prior Publication Data
US 2024/0010179 A1 Jan. 11, 2024

(51) Int. Cl.
| | |
|---|---|
| *B60T 17/02* | (2006.01) |
| *B01D 53/26* | (2006.01) |
| *B60T 17/00* | (2006.01) |
| *F04B 49/02* | (2006.01) |
| *F04B 49/03* | (2006.01) |
| *F04B 49/035* | (2006.01) |

(52) U.S. Cl.
CPC .............. *B60T 17/02* (2013.01); *B01D 53/26* (2013.01); *B60T 17/004* (2013.01); *F04B 49/022* (2013.01); *F04B 49/03* (2013.01); *F04B 49/035* (2013.01)

(58) Field of Classification Search
CPC ........ B60T 17/004; B60T 17/02; B60T 17/04; B01D 53/26; F04B 49/022; F04B 49/035; F04B 49/03
See application file for complete search history.

(56) References Cited

U.S. PATENT DOCUMENTS 2,037,873 A * 4/1936 Angell ...................... F16K 3/24
251/324
7,631,656 B2 12/2009 Hoffman

FOREIGN PATENT DOCUMENTS

| JP | H0613157 Y2 * | 4/1994 | |
|---|---|---|---|
| KR | 100305708 B1 * | 9/2001 | ............. F04B 39/121 |
| PL | 166202 B1 * | 4/1995 | ............... F04B 53/08 |

OTHER PUBLICATIONS

Bendix Commercial Vehicle Systems LLC, "Bendix AD-9si & AD-9si PuraGuard Oil Coalescing Air Dryer," SD-08-2433 Service Data Sheet, Mar. 2019, 16 pages, Bendix Commercial Vehicle Systems LLC, Avon Ohio U.S.A.

* cited by examiner

*Primary Examiner* — Atif H Chaudry
(74) *Attorney, Agent, or Firm* — Cheryl L. Greenly; Brian E. Kondas; Geoffrey A. Kudlo

(57) ABSTRACT

An air dryer apparatus is provided for a vehicle air brake charging system. The air dryer apparatus comprises an air dryer governor assembly. The air dryer governor assembly includes a plastic sleeve having an external sleeve surface and an internal sleeve surface that defines a piston bore. The air dryer governor assembly also includes a piston disposed in the piston bore and slidable along the internal sleeve surface between a preset cut-out setting and a preset cut-in setting of the air dryer governor assembly. The air dryer governor assembly further includes one or more ribs disposed on the external sleeve surface to prevent deformation of the plastic sleeve when the piston slides along the internal sleeve surface between the preset cut-out and cut-in settings.

16 Claims, 8 Drawing Sheets

AIR DRYER APPARATUS FOR A VEHICLE AIR BRAKE CHARGING SYSTEM

BACKGROUND

The present application relates to vehicle air brake charging systems, and is particularly directed to an air dryer apparatus for a vehicle air brake charging system, such as a truck air brake charging system.

A truck air brake charging system includes a vehicle air compressor which builds air pressure for an air braking system. The compressor is typically lubricated by an engine oil supply. A governor controls system air pressure between a preset maximum and minimum pressure level by monitoring the air pressure in a supply reservoir. When the supply reservoir air pressure becomes greater than that of a preset "cut-out" setting of the governor, the governor controls the compressor to stop the compressor from building air and also causes an air dryer downstream from the compressor to go into a purge cycle. As the supply reservoir air pressure drops to a preset "cut-in" setting of the governor, the governor returns the compressor back to building air and the air dryer to the charge cycle.

The air dryer is an in-line filtration system that collects and removes both water vapor and oil droplets from the compressor discharge air after it leaves the compressor. This results in cleaner, drier air being supplied to the air braking system, increases the life of the components of the brake assembly, and aids in the prevention of air line and component freeze ups in winter weather. The air dryer typically uses a replaceable "spin on" cartridge containing a desiccant material and an oil separator. Most of the oil droplets are removed by the oil separator as the air passes through the inlet tube into the air dryer. The air then moves through the desiccant material which adsorbs most of the water vapor.

When the air pressure in the supply reservoir reaches the preset cut-out setting of the governor, the governor makes the compressor stop building air and allows the air dryer's "purge cycle" to begin. During the purge cycle, the desiccant material is regenerated (i.e., its ability to remove water is renewed) by a reversal of the saturation process. A small amount of dry air passes back through the desiccant material and the water that has been collected, as well as any oil droplets collected by the oil separator, are purged out through a purge valve to atmosphere.

Some air dryers include a fully integrated governor. In these air dryers, the air dryer includes an air dryer housing having a bore in which a governor assembly is disposed. The governor assembly includes a metallic sleeve in which a piston slides between different positions to provide the preset cut-out (130 psi) and the preset cut-in settings of the governor. The metallic sleeve is located in the bore to maintain the piston and other internal components in place relative to the air dryer housing.

During operation of the vehicle air brake charging system, the governor cycles many times between the preset cut-out setting and the preset cut-in setting. Due to normal wear and tear of components, the governor assembly needs to be replaced from time to time. Accordingly, those skilled in the art continue with research and development efforts in the field of air dryers and governors for vehicle air brake charging systems.

SUMMARY

In accordance with one embodiment, an air dryer apparatus is provided for a vehicle air brake charging system. The air dryer apparatus comprises an air dryer governor assembly. The air dryer governor assembly includes a plastic sleeve having an external sleeve surface and an internal sleeve surface that defines a piston bore. The air dryer governor assembly also includes a piston disposed in the piston bore and slidable along the internal sleeve surface between a preset cut-out setting and a preset cut-in setting of the air dryer governor assembly. The air dryer governor assembly further includes one or more ribs disposed on the external sleeve surface to prevent deformation of the plastic sleeve when the piston slides along the internal sleeve surface between the preset cut-out and cut-in settings.

In accordance with another embodiment, an air dryer apparatus is provided for a vehicle air brake charging system. The air dryer apparatus comprises an air dryer having a housing surface that defines a governor bore. The air dryer apparatus further comprises an air dryer governor assembly disposed in the governor bore. The air dryer governor assembly includes a governor sleeve having an internal sleeve surface that defines a piston bore and an external sleeve surface that faces the housing surface of the air dryer. The air dryer governor assembly also includes a governor piston disposed in the piston bore and slidable along the internal sleeve surface between a preset cut-out setting and a preset cut-in setting of the air dryer governor assembly. The air dryer governor assembly further includes one or more ribs disposed on the external sleeve surface and abutting against the housing surface of the air dryer to prevent deformation of the governor sleeve when the governor piston slides along the internal sleeve surface between the preset cut-out and cut-in settings.

In accordance with yet another embodiment, an air dryer apparatus is provided for a vehicle air brake charging system. The air dryer apparatus comprises a substantially cylinder-shaped governor sleeve having an external sleeve surface and an internal sleeve surface that defines a piston bore. The air dryer apparatus also comprises a governor piston disposed in the piston bore and slidable along the internal sleeve surface between a preset cut-out setting and a preset cut-in setting. The air dryer apparatus further comprises stiffening means disposed on the external sleeve surface and for, providing stiffness of the sleeve to prevent deformation of the governor sleeve when the governor piston slides along the internal sleeve surface between the preset cut-out and cut-in settings.

In accordance with still another embodiment, an apparatus is provided for a vehicle system. The apparatus comprises a substantially cylinder-shaped sleeve having an external sleeve surface and an internal sleeve surface that defines a piston bore. The apparatus also comprises a piston disposed in the piston bore and slidable along the internal sleeve surface between opposite end positions. The apparatus further comprises one or more ribs disposed on the external sleeve surface and for, preventing deformation of the sleeve when the piston slides along the internal sleeve surface between the opposite positions. The sleeve and the one or more ribs comprise a nylon material, and each of the one or more ribs is reinforced with glass fibers that are oriented in a direction substantially parallel to a longitudinal central axis of the piston.

DETAILED DESCRIPTION

The present application is directed to an apparatus for a vehicle system. The specific construction of the apparatus and the industry in which the apparatus is implemented may vary. It is to be understood that the disclosure below provides a number of embodiments or examples for implementing different features of various embodiments. Specific examples of components and arrangements are described to simplify the present disclosure. These are merely examples and are not intended to be limiting. By way of example, an air dryer apparatus for a vehicle air brake charging system, such as a truck air brake charging system, is described herein.

Figure 1:
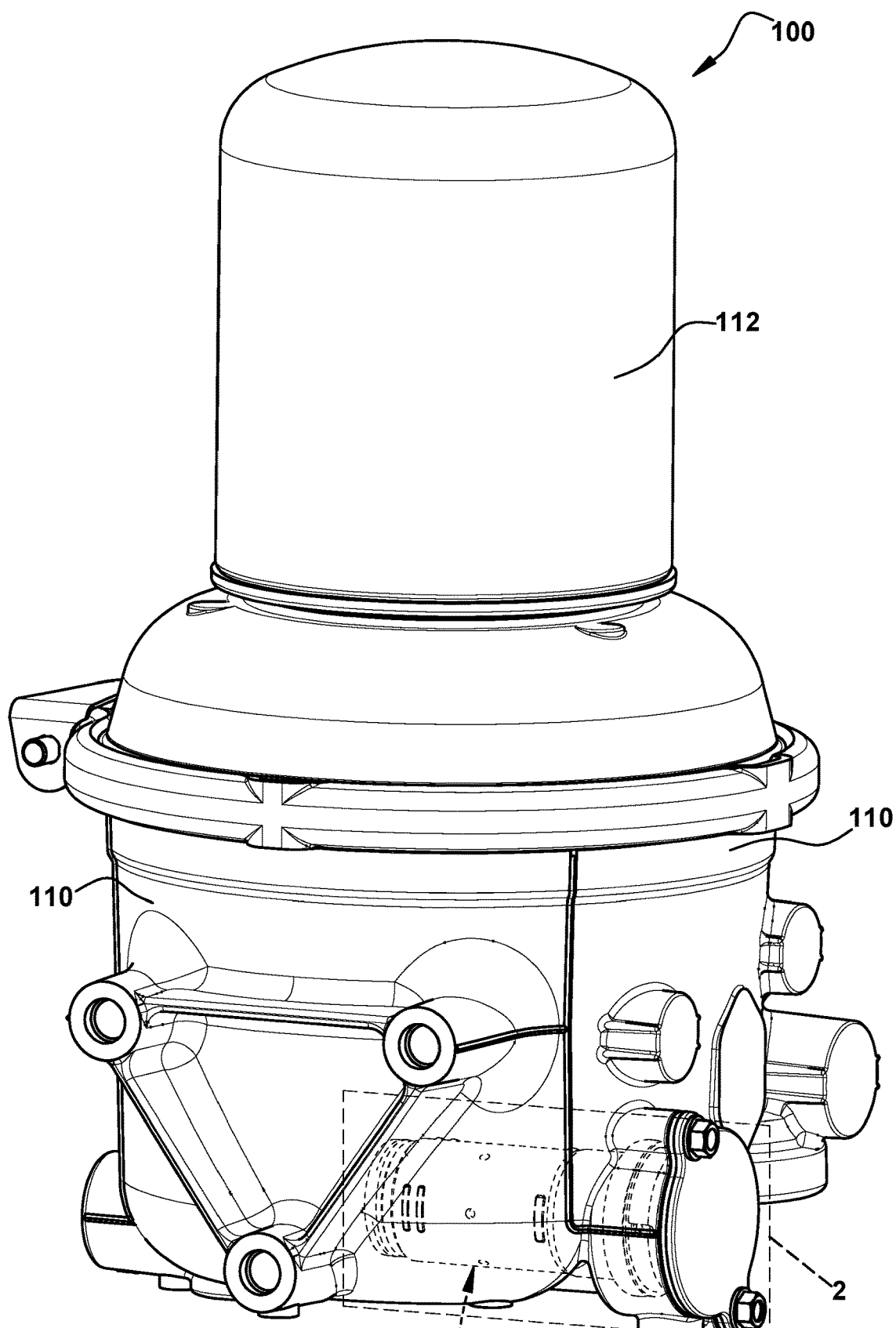
FIG. 1 is a perspective view of an air dryer apparatus constructed in accordance with an embodiment.

Referring to FIG. 1, a perspective view of an air dryer apparatus 100 constructed in accordance with an embodiment is illustrated. The air dryer apparatus 100 comprises an air dryer housing 110 and a replaceable filtration cartridge 112 that is attached to the air dryer housing 110. An air dryer governor assembly 120, shown in heavier, darker lines in FIG. 1, is disposed inside the air dryer housing 110. Structure and operation of air dryers are known and, therefore, will not be described.

Figure 2:
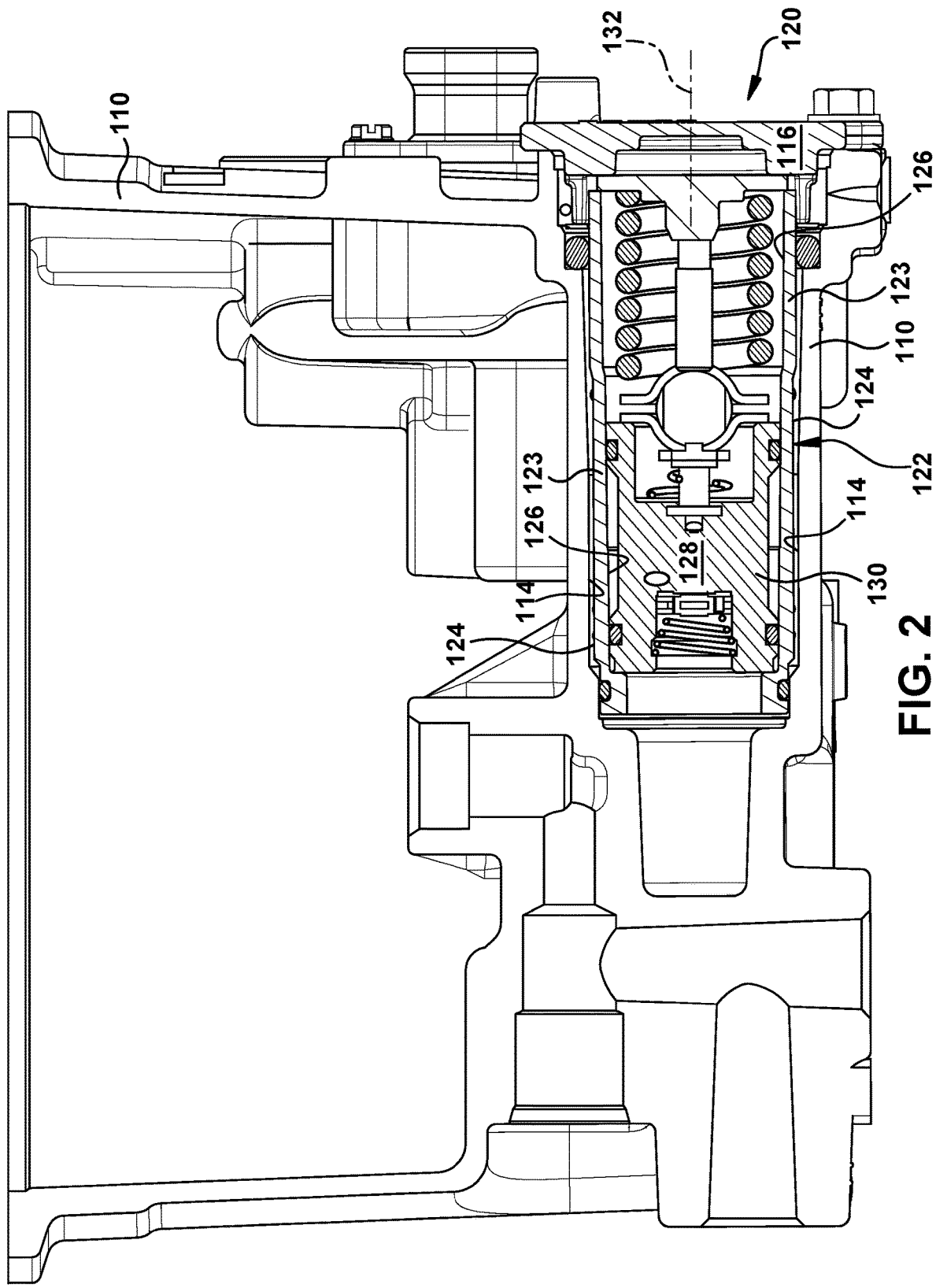
FIG. 2 is an enlarged sectional view of a portion of the air dryer apparatus 100 of FIG. 1, designated approximately with rectangle "2" shown in FIG. 1.

Referring to FIG. 2, an enlarged sectional view of a portion of the air dryer apparatus 100 of FIG. 1, designated approximately with rectangle "2" shown in FIG. 1, is illustrated. The air dryer housing 110 has a housing surface 114 that defines a governor bore 116 in which the air dryer governor assembly 120 is disposed. The air dryer governor assembly 120 includes a substantially cylinder-shaped plastic governor sleeve 122 having a body portion 123. The plastic governor sleeve 122 has an external sleeve surface 124 and an internal sleeve surface 126 that defines a piston bore 128. The external sleeve surface 124 faces the housing surface 114 of the air dryer housing 110. The external sleeve surface 124 has an end portion 124a, an opposite end portion 124c, and a central portion 124b that interconnects the end portions 124a, 124c.

The air dryer governor assembly 120 also includes a governor piston 130 disposed in the piston bore 128. The governor piston 130 is slidable along the internal sleeve surface 126 between a preset cut-out setting and a preset cut-in setting of the air dryer governor assembly 120. The governor piston 130 has a longitudinal central axis 132 along which the governor piston 130 slides between the preset cut-out setting and the preset cut-in setting.

Figure 3:
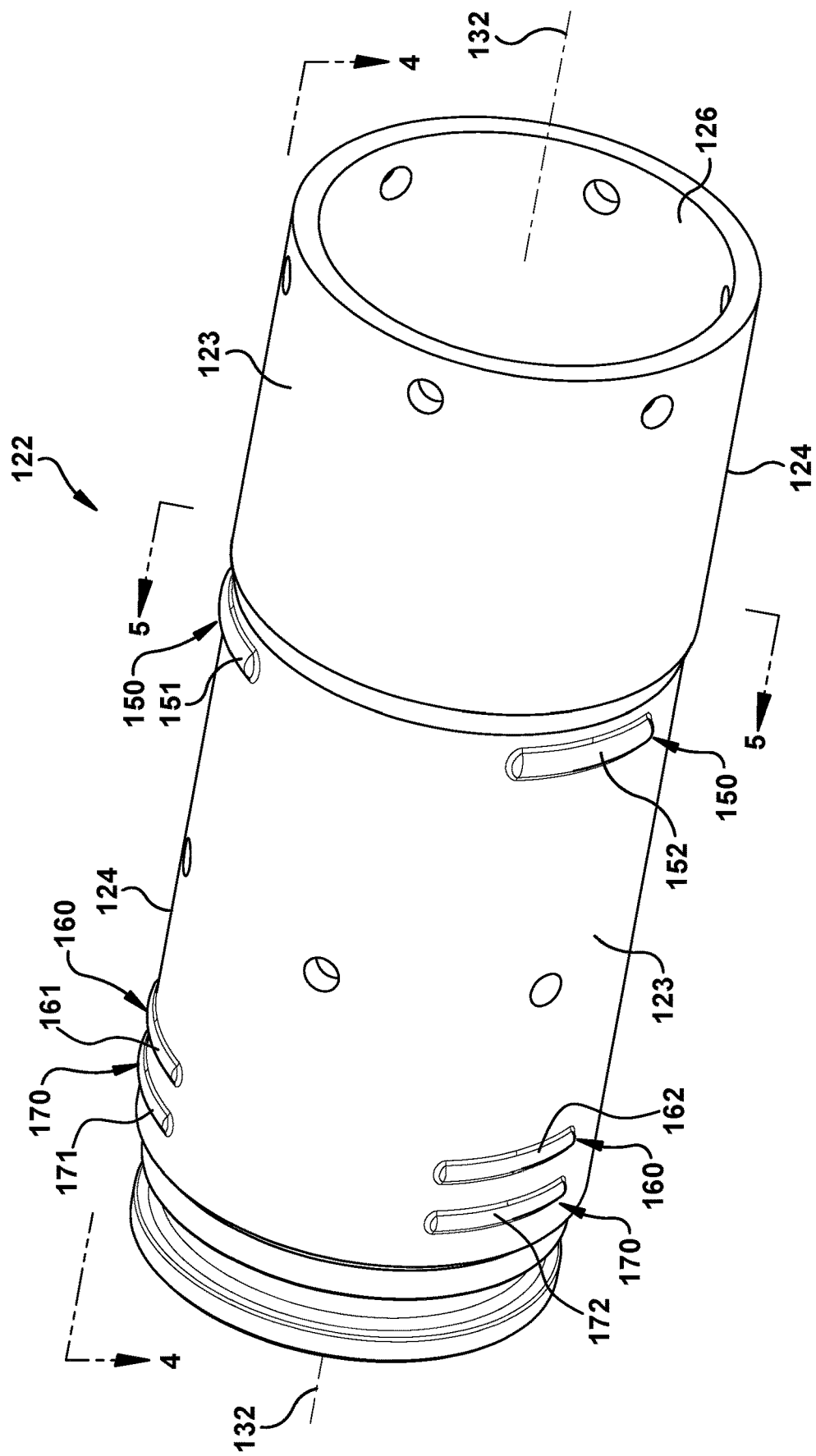
FIG. 3 is a perspective view of a plastic sleeve used in the air dryer apparatus of FIGS. 1 and 2 in accordance with an embodiment.
Figure 4:
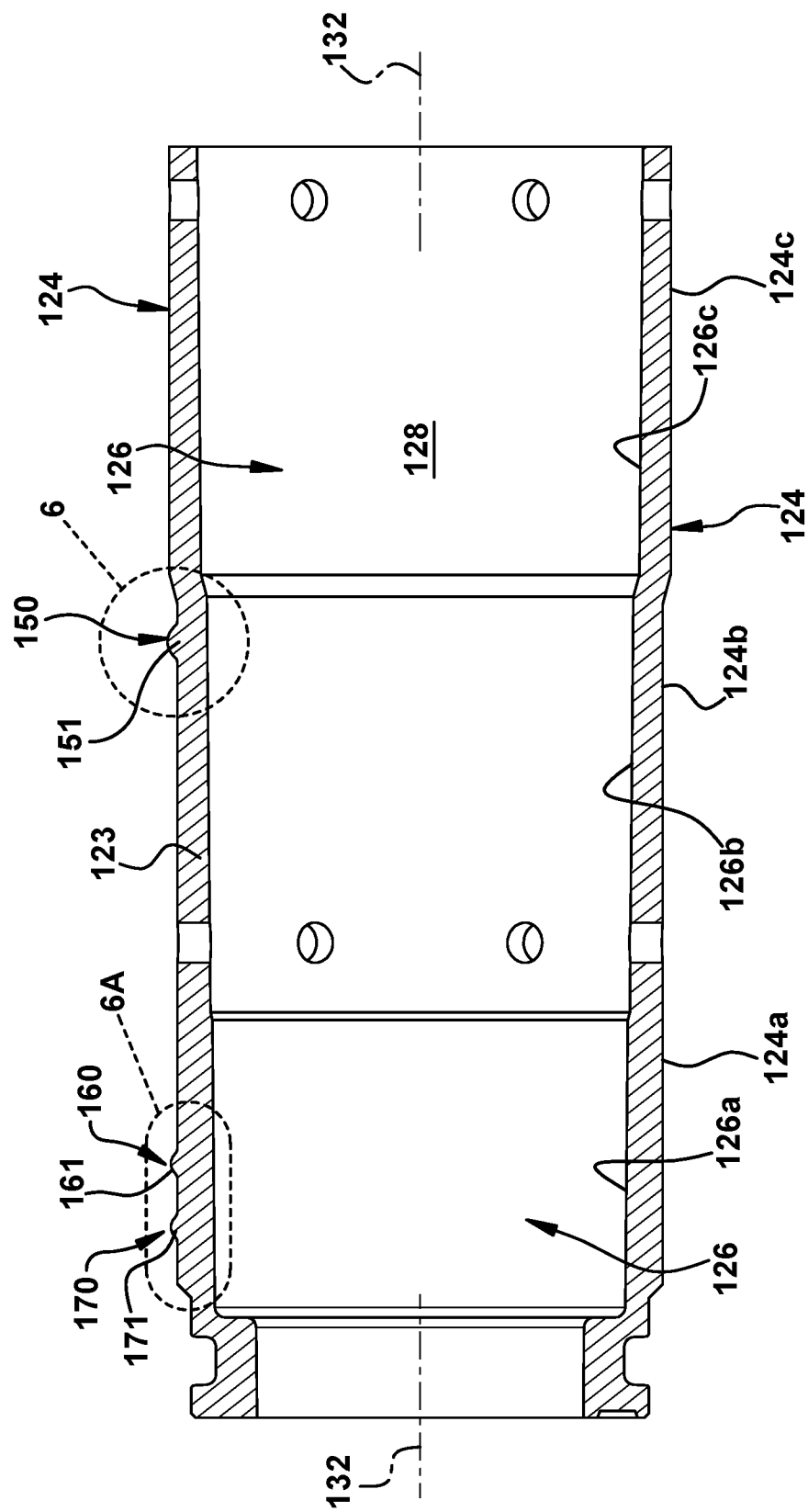
FIG. 4 is a sectional view taken approximately along line 4-4 shown in FIG. 3, and showing an internal surface of the plastic sleeve.

Referring to FIG. 3, a perspective view of the plastic governor sleeve 122 used in the air dryer governor assembly 120 in accordance with an embodiment is illustrated. FIG. 4 is a sectional view taken approximately along line 4-4 shown in FIG. 3, and showing the internal sleeve surface 126 of the plastic governor sleeve 122. Inner diameter of the plastic governor sleeve 122 in the vicinity of surface portion 126a is in a range between about 1.226 in (31.145 mm) and about 1.241 in (31.520 mm). Inner diameter of the plastic governor sleeve 122 in the vicinity of surface portion 126b is in a range between about 1.253 n (31.826 mm) and about 1.275 in (32.385 mm). Inner diameter of the plastic governor sleeve 122 in the vicinity of surface portion 126c is in a range between about 1.310 in (33.274 mm) and about 1.332 in (33.830 mm). The inner diameter of the plastic governor sleeve 122 gradually increases from left to right (as viewed looking at FIG. 4) to form a generally diverging conical shape, similar to a draft tube.

Outer diameter of the plastic governor sleeve 122 in the vicinity of the end portion 124a is in a range between about 1.44 in (36.576 mm) and about 1.46 in (37.084 mm). Outer diameter of the plastic governor sleeve 122 in the vicinity of the opposite end portion 124c is in a range between about 1.46 in (37.084 mm) and about 1.54 in (39.116 mm). Axial length of the plastic governor sleeve 122 is in a range between about 3.79 in (90.26 mm) and about 3.81 in (96.77 mm).

Three sets of ribs 150, 160, 170 are axially spaced apart from each other along the longitudinal central axis 132 of the governor piston 130. Axial distance between the set of ribs 150 and the set of ribs 160 is in a range between about 1.54 in (39.116 mm) and about 1.58 in (40.132 mm). Axial distance between the set of ribs 160 and the set of ribs 170 is in a range between about 0.17 in (4.318 mm) and about 0.21 in (5.334 mm). In a preferred embodiment, the axial distance between the set of ribs 150 and the set of ribs 160 is about 1.56 in (39.624 mm), and the axial distance between the set of ribs 160 and the set of ribs 170 is about 0.19 in (4.826 mm).

Although three sets of ribs 150, 160, 170 are shown in FIGS. 3 and 4 in a preferred embodiment, it is conceivable that any number of sets of ribs be disposed on the external sleeve surface 124 and axially spaced apart from each other along the longitudinal central axis 132. The structure and functionality of each of the three sets of ribs 150, 160, 170 are similar. For simplicity and purpose of explanation, only the one set of ribs 150 is described in detail herein.

Figure 5:
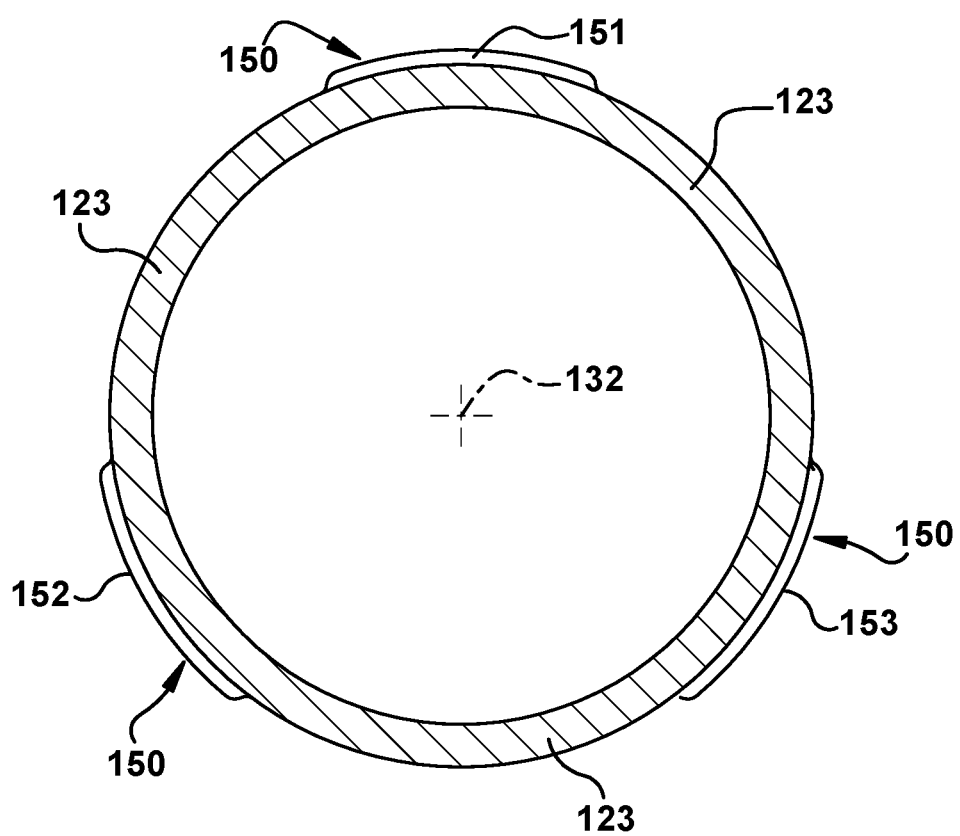
FIG. 5 is a sectional view taken approximately along line 5-5 shown in FIG. 3, and showing an arrangement of a set of ribs on an external surface of the plastic sleeve.

Referring to FIG. 5, a sectional view taken approximately along line 5-5 shown in FIG. 3 is illustrated. More specifically, FIG. 5 shows an arrangement of the one set of ribs 150 on the external sleeve surface 124 of the plastic governor sleeve 122. The set of ribs 150 extends around the longitudinal central axis 132 of the governor piston 130. The set of ribs 150 includes three separate ribs 151, 152, 153 that are circumferentially spaced apart from each other around the longitudinal central axis 132 of the governor piston 130.

Each of the ribs 151, 152, 153 abuts against the housing surface 114 (FIG. 2) of the air dryer housing 110.

Circumferential length of each of the ribs 151, 152, 153 is in a range between about 0.500 in (12.70 mm) and about 0.552 in (14.02 mm). Circumferential distance between an end of one of the ribs 151, 152, 153 and an end of another one of the ribs 151, 152, 153 is in a range between about 0.96 in (24.384 mm) and about 1.06 in (26.924 mm). In a preferred embodiment, the circumferential length of the rib 151 is about 1.508 in (38.303 mm), the circumferential length of the rib 152 is about 1.508 in (38.303 mm), the circumferential length of the rib 153 is about 1.508 in (38.303 mm), the circumferential distance between one end of rib 151 and one end of rib 152 is about 1.012 in (25.705 mm), the circumferential distance between one end of rib 152 and one end of rib 153 is about 1.012 in (25.705 mm), and the circumferential distance between one end of rib 151 and one end of rib 153 is about 1.012 in (25.705 mm).

Although three separate ribs 151, 152, 153 are shown in FIG. 5 in a preferred embodiment, it is conceivable that the set of ribs 150 comprises any number of separate ribs that extend around the longitudinal central axis 132. The structure and functionality of each of the ribs 151, 152, 153 are similar. For simplicity and purpose of explanation, only the one rib 151 is described in detail herein.

Figure 6:
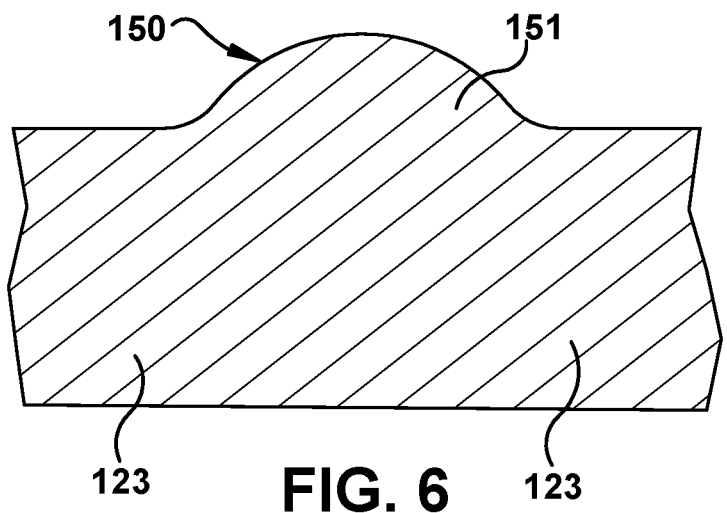
FIG. 6 is an enlarged view of a portion of FIG. 4, designated approximately with circle "6" shown in FIG. 4, and showing details of a cross-sectional profile of an individual rib on an external surface of the plastic sleeve.

Referring to FIG. 6, details of a cross-sectional profile of the individual rib 151 on the external sleeve surface 124 of the plastic governor sleeve 122 are shown. Height (i.e., thickness) of the rib 151 is in a range between about 0.025 in (0.635 mm) and about 0.035 in (0.889 mm), and the cross-sectional profile is substantially half-moon shaped. In a preferred embodiment, the height of the rib 151 is about 0.03 in (0.762 mm), and the cross-sectional profile is substantially half-moon shaped, such as shown in FIG. 6. The half-moon shape may be more oblong or less oblong than as shown in FIG. 6. Other cross-sectional profiles of the individual rib 151 are possible.

Figure 6A:
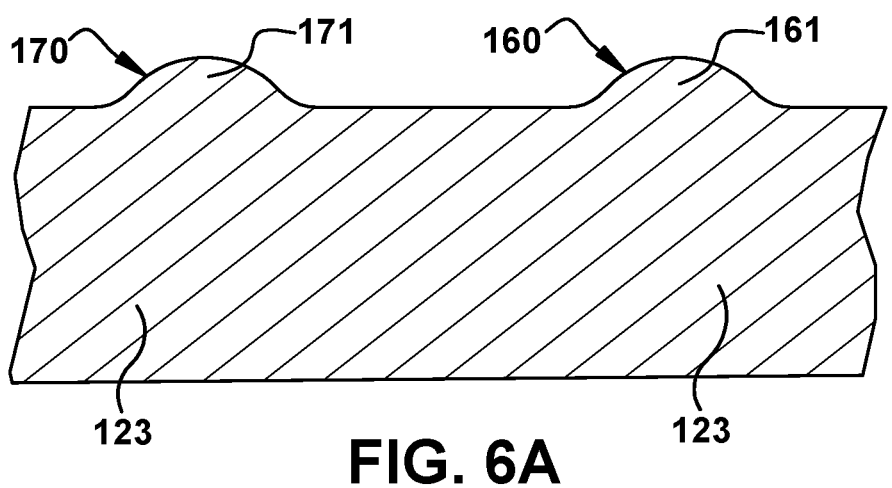
FIG. 6A is an enlarged view of a portion of FIG. 4, designated approximately with oval "6A" shown in FIG. 4, and showing details of a cross-sectional profile of two individual ribs on an external surface of the plastic sleeve.

Referring to FIG. 6A, details of a cross-sectional profile of an individual rib 161 of the set of ribs 160 and an individual rib 171 of the set of ribs 170 on the external sleeve surface 124 of the plastic governor sleeve 122 are shown. Height (i.e., thickness) of each of the ribs 161, 171 is in a range between about 0.015 in (0.381 mm) and about 0.025 in (0.635 mm), and the cross-sectional profile is substantially half-moon shaped. In a preferred embodiment, the height of each of the ribs 161, 171 is about 0.02 in (0.508 mm), and the cross-sectional profile is substantially half-moon shaped, such as shown in FIG. 6A. The half-moon shape may be more oblong or less oblong than as shown in FIG. 6A. Other cross-sectional profiles of each of the individual ribs 161, 171 are possible.

The three separate ribs 151, 152, 153 of the set of ribs 150 are larger than the three separate ribs of each of the other two sets of ribs 160, 170. As best shown in FIG. 3, only two separate ribs 161, 162 of the set of ribs 160 and only two separate ribs 171, 172 of the set of ribs 170 are visible. The third rib of the set of ribs 160 and the third rib of the set of ribs 170 are hidden from view in FIG. 3. The three larger separate ribs 151, 152, 153 of the set of ribs 150 are located closer to the central portion 124b of the external sleeve surface 124 than the three separate ribs of each of the other two sets of ribs 160, 170.

The three separate ribs of each set of the three sets of ribs 150, 160, 170 are circumferentially spaced apart from each other by a distance to provide sufficient space between ends of adjacent ribs for air flow therethrough during operation of the air dryer governor assembly 120. The locations of the three sets of ribs 150, 160, 170 relative to each other on the external sleeve surface 124 as well as the distances between adjacent ribs in each set of ribs provides a maximum strength of the plastic governor sleeve 122 using a minimum number of ribs while supporting sufficient air flow through the air dryer governor assembly 120.

The plastic governor sleeve 122 preferably comprises a nylon material that is reinforced with glass fibers. As an example, the nylon material of the plastic governor sleeve 122 may comprise Nylon 6/6 with glass fiber of 43%. Other nylon materials with other percentages of glass fiber are possible. Glass fibers of each rib are oriented in a direction substantially parallel to the longitudinal central axis 132 of the governor piston 130. The body portion 123 of the plastic governor sleeve 122 is reinforced with glass fibers oriented in one or more directions that are different from the direction in which glass fibers of each rib are oriented.

Figure 7:
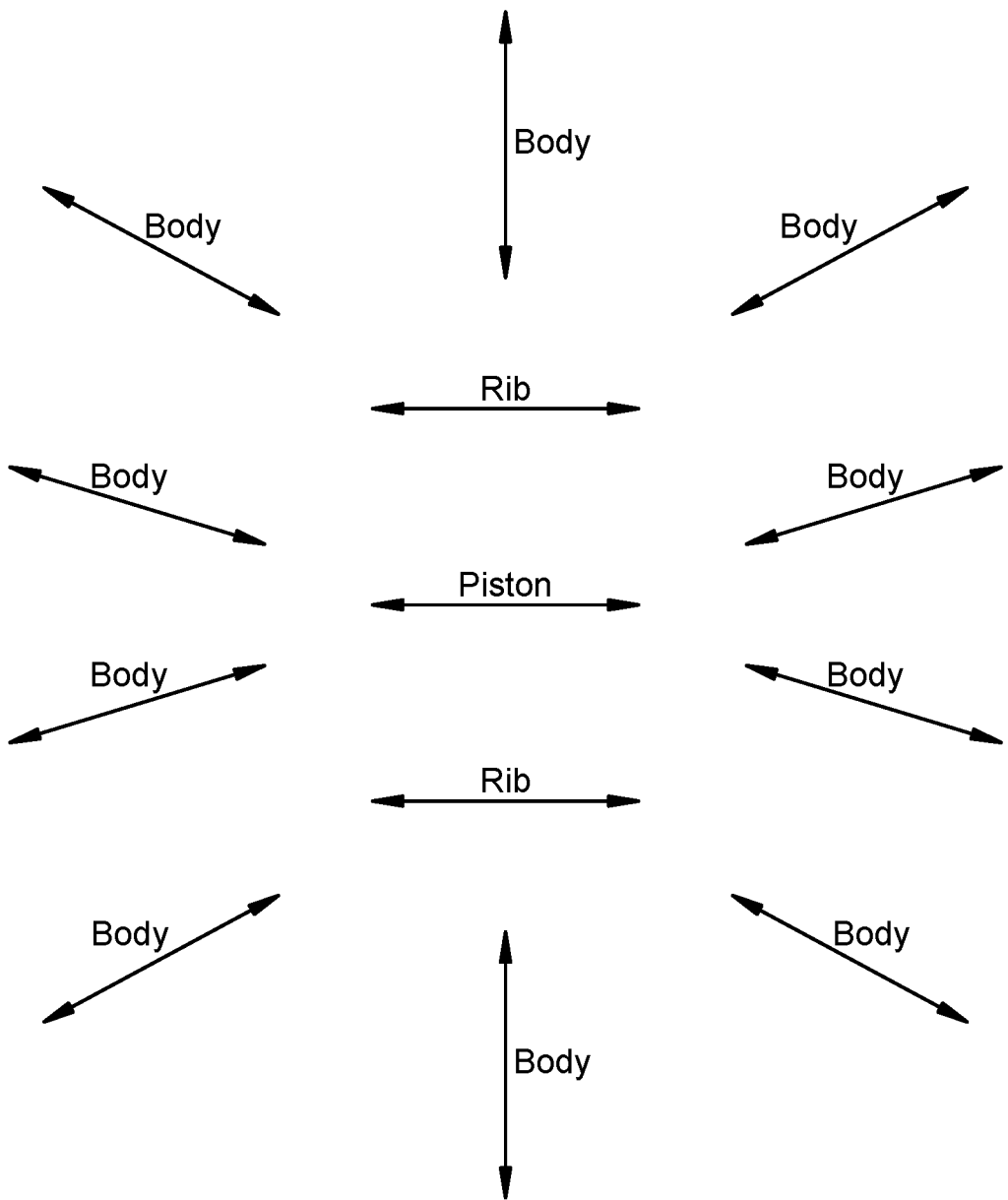
FIG. 7 a schematic diagram showing one or more arrows "rib" indicating orientation of glass fibers in the individual rib of FIG. 6, one or more arrows "body" indicating orientation of glass fibers in a body portion of the plastic sleeve of FIG. 6, and one or more arrows "piston" indicating directions of movement of a piston within the plastic sleeve.

Referring to FIG. 7, a schematic diagram showing orientation of glass fiber in an individual rib (e.g., the individual rib 151 shown in FIGS. 4 and 5) relative to orientation of glass fibers in the body portion 123 of the plastic governor sleeve 122 is illustrated. More specifically, FIG. 7 includes one or more arrows "rib" indicating orientation of glass fibers in the individual rib 151, one or more arrows "body" indicating orientation of glass fibers in the body portion 123, and one or more arrows "piston" indicating opposite directions of movement of the governor piston 130 (FIG. 2) along its longitudinal central axis 132 within the plastic governor sleeve 122. The "rib" arrows are oriented in a direction substantially parallel to the longitudinal central axis 132 of the governor piston 130, and the "body" arrows are oriented in one or more directions that are different from the direction in which the "rib" arrows are oriented.

In accordance with an aspect of the present disclosure, the geometry of the ribs of the three sets of ribs 150, 160, 170 reinforces the plastic governor sleeve 122 to withstand loads from pressure, humidity, air flow, and high temperatures without experiencing performance issues. Notably, the ribs of the three sets of ribs 150, 160, 170 cooperate together to maintain the geometry of the plastic governor sleeve 122 with minimal deformation when the governor piston 130 slides along the internal sleeve surface 126 between the preset cut-out and cut-in settings. This prevents a gap from forming between the plastic governor sleeve 122 and the governor piston 130. By preventing a gap from being formed, air leakage between the plastic governor sleeve 122 and the governor piston 130 is avoided.

A number of advantages are provided by the disclosed plastic sleeve 122 of FIG. 3. One advantage is weight savings in using a plastic material instead of a metallic material. The reduction in weight results in a reduction in fuel consumption by the vehicle and thereby a reduction in carbon dioxide emission by the vehicle.

Another advantage is the comparable structural rigidity of the plastic sleeve 122 to a metallic sleeve. The comparable structural rigidity of the plastic sleeve 122 is due to its anisotropic properties (i.e., its different mechanical behavior in the x, y, and z directions). Moreover, the shape, dimensions, locations, and pattern (i.e., geometry) of the ribs on the external sleeve surface 124, as well as the orientation of glass fibers in the ribs, augment the structural rigidity of the plastic sleeve 122.

Figure 8:
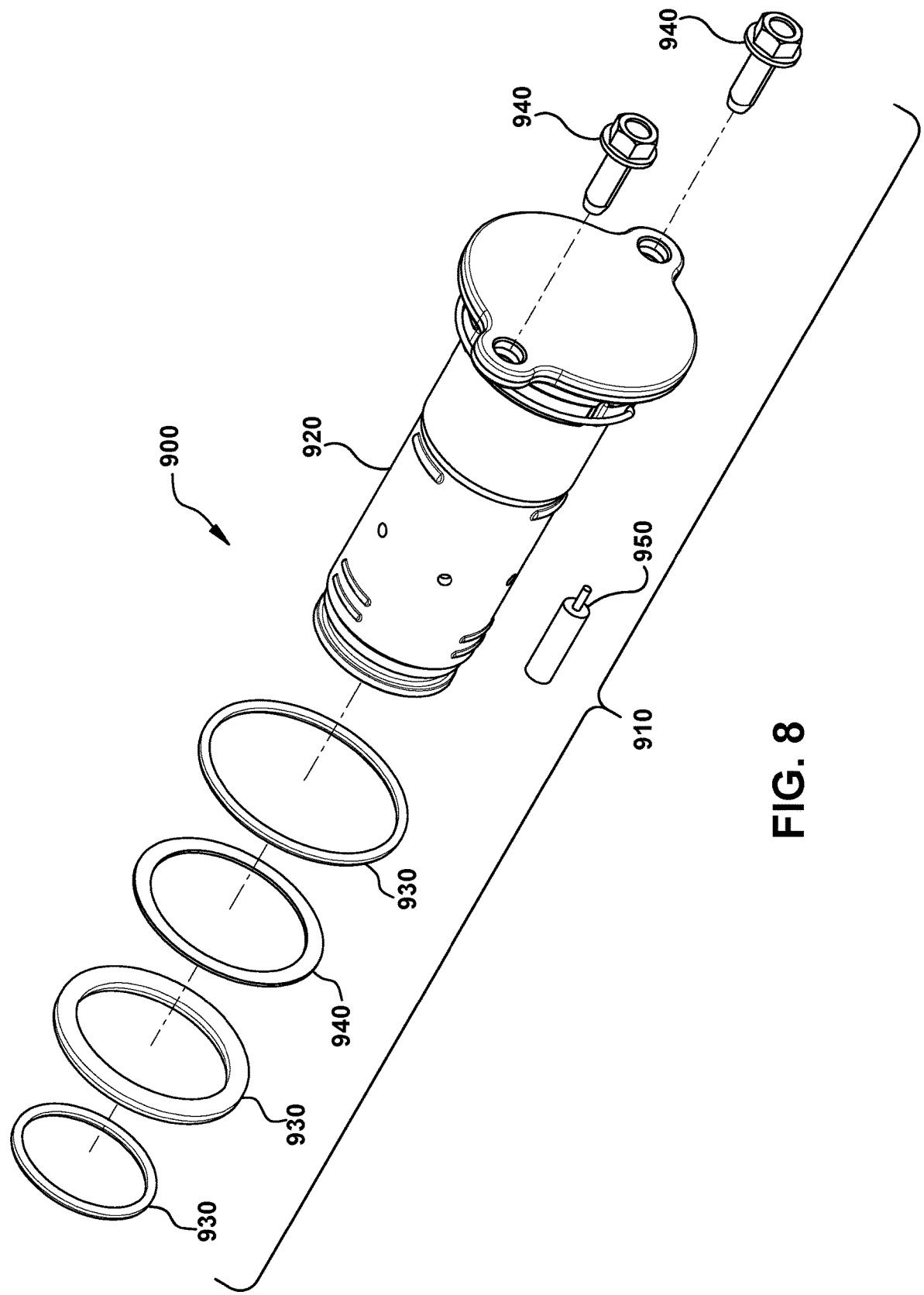
FIG. 8 is an exploded view of a portion of FIG. 2, showing an air dryer governor replacement kit in accordance with an embodiment.

Although the above description describes the plastic governor sleeve 122 embodied in an air dryer apparatus 100 comprising the air dryer governor assembly 120, it is conceivable that the plastic governor sleeve 122 be embodied in a different apparatus. For example, as shown in FIG. 8, an apparatus 900 comprises an air dryer governor replacement kit 910. The air dryer governor replacement kit 910 includes a governor & cover assembly 920, and a combination of kit components including a number of O-rings 930, a number of hardware pieces (e.g., screws and washers) 940, and a tube of lubricant 950. The governor & cover assembly 920 shown in FIG. 8 includes a plastic governor sleeve 922 that has the same structure and functionality as the plastic governor sleeve 122 shown in FIG. 3.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An air dryer apparatus for a vehicle air brake charging system, the air dryer apparatus comprising:
    an air dryer governor assembly including (i) a plastic sleeve having an external sleeve surface and an internal sleeve surface that defines a piston bore, (ii) a piston disposed in the piston bore and slidable along the internal sleeve surface between a preset cut-out setting and a preset cut-in setting of the air dryer governor assembly, and (iii) one or more ribs disposed on the external sleeve surface to prevent deformation of the plastic sleeve when the piston slides along the internal sleeve surface between the preset cut-out and cut-in settings, wherein each of the one or more ribs of the plastic sleeve is reinforced with glass fibers that are oriented in a direction substantially parallel to a longitudinal central axis of the piston.

2. The air dryer apparatus according to claim 1, wherein (i) the plastic sleeve includes a cylinder-shaped body portion that is reinforced with glass fibers, and (ii) the glass fibers of the cylinder-shaped body portion are oriented in one or more directions that are different from the direction in which the glass fibers of each rib are oriented.

3. The air dryer apparatus according to claim 1, wherein the one or more ribs comprise at least one set of ribs that extend around a longitudinal central axis of the piston.

4. The air dryer apparatus according to claim 3, wherein (i) the at least one set of ribs comprises three sets of ribs that are axially spaced apart from each other along the longitudinal central axis of the piston, and (ii) each set of ribs includes three separate ribs that are circumferentially spaced apart from each other around the longitudinal central axis of the piston.

5. The air dryer apparatus according to claim 4, wherein (i) the three separate ribs of one set of the three sets of ribs are larger than the three separate ribs of each of the other two sets of ribs, and (ii) the three larger separate ribs of the one set of ribs are located closer to a central portion of the external sleeve surface than the three separate ribs of each of the other two sets of ribs.

6. The air dryer apparatus according to claim 4, wherein the three separate ribs of each set of the three sets of ribs are circumferentially spaced apart from each other by a distance to provide sufficient space between ends of adjacent ribs for air flow therethrough during operation of the air dryer governor assembly.

7. The air dryer apparatus according to claim 1, wherein each of the one or more ribs of the plastic sleeve has a cross-sectional profile that is substantially half-moon shaped.

8. The air dryer apparatus according to claim 1, wherein the plastic sleeve comprises a nylon material.

9. The air dryer apparatus according to claim 1 further comprising:
    a combination of kit components including a number of O-rings, a number of hardware pieces, and a tube of lubricant, wherein the combination of kit components and the air dryer governor assembly comprise an air dryer governor replacement kit.

10. An air dryer apparatus for a vehicle air brake charging system, the air dryer apparatus comprising:
    an air dryer having a housing surface that defines a governor bore; and
    an air dryer governor assembly disposed in the governor bore, the air dryer governor assembly including (i) a governor sleeve having an internal sleeve surface that defines a piston bore and an external sleeve surface that faces the housing surface of the air dryer, (ii) a governor piston disposed in the piston bore and slidable along the internal sleeve surface between a preset cut-out setting and a preset cut-in setting of the air dryer governor assembly, and (iii) one or more ribs disposed on the external sleeve surface and abutting against the housing surface of the air dryer to prevent deformation of the governor sleeve when the governor piston slides along the internal sleeve surface between the preset cut-out and cut-in settings; wherein the governor sleeve comprises a nylon material reinforced with glass fibers and the glass fibers of each rib are oriented in a direction substantially parallel to a longitudinal central axis of the governor piston of the air dryer governor assembly.

11. The air dryer apparatus according to claim 10, wherein the one or more ribs comprise at least one set of ribs that extend around a longitudinal central axis of the governor piston.

12. The air dryer apparatus according to claim 11, wherein (i) the at least one set of ribs comprises three sets of ribs that are axially spaced apart from each other along the longitudinal central axis of the governor piston, and (ii) each set of ribs includes three separate ribs that are circumferentially spaced apart from each other around the longitudinal central axis of the governor piston.

13. An air dryer apparatus for a vehicle air brake charging system, the air dryer apparatus comprising:
    a substantially cylinder-shaped governor sleeve having an external sleeve surface and an internal sleeve surface that defines a piston bore;
    a governor piston disposed in the piston bore and slidable along the internal sleeve surface between a preset cut-out setting and a preset cut-in setting; and
    stiffening means disposed on the external sleeve surface and for, providing stiffness of the sleeve to prevent deformation of the governor sleeve when the governor piston slides along the internal sleeve surface between the preset cut-out and cut-in settings, wherein the governor sleeve and the stiffening means comprise a nylon material that is reinforced with glass fibers wherein (i) the stiffening means includes one or more ribs disposed on the external sleeve surface, and (ii) each of the one or more ribs of the governor sleeve is reinforced with glass fibers that are oriented in a direction substantially parallel to a longitudinal central axis of the governor piston.

14. An apparatus for a vehicle system, the apparatus comprising:
- a substantially cylinder-shaped sleeve having an external sleeve surface and an internal sleeve surface that defines a piston bore;
- a piston disposed in the piston bore and slidable along the internal sleeve surface between opposite end positions; and
- one or more ribs disposed on the external sleeve surface and for, preventing deformation of the sleeve when the piston slides along the internal sleeve surface between the opposite positions, wherein (i) the sleeve and the one or more ribs comprise a nylon material, and (ii) each of the one or more ribs is reinforced with glass fibers that are oriented in a direction substantially parallel to a longitudinal central axis of the piston, wherein the cylinder-shaped sleeve includes a body portion reinforced with glass fibers oriented in one or more directions that are different from the direction in which the glass fibers of each of the one or more ribs are oriented.

15. The apparatus according to claim 14, wherein (i) the one or more ribs comprise three sets of ribs that are axially spaced apart from each other along the longitudinal central axis of the piston, and (ii) each set of ribs includes three separate ribs that are circumferentially spaced apart from each other around the longitudinal central axis of the piston.

16. The apparatus according to claim 14, wherein each of the one or more ribs has a cross-sectional profile that is substantially half-moon shaped.

\* \* \* \* \*